Merritt & Kimplen.
Tank Feeder.
Nº 30,829.          Patented Dec. 4, 1860.
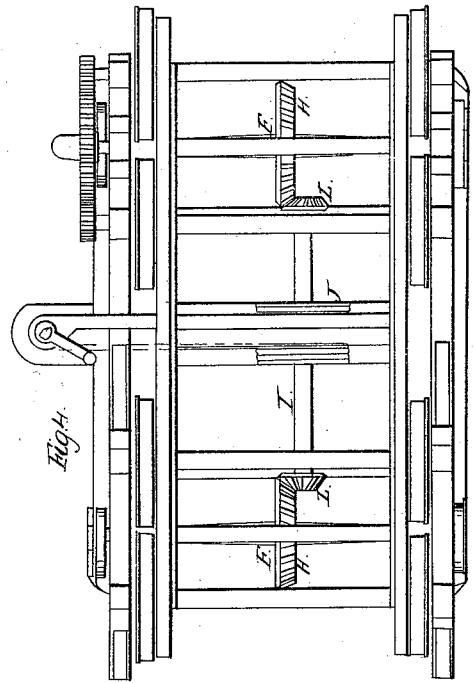
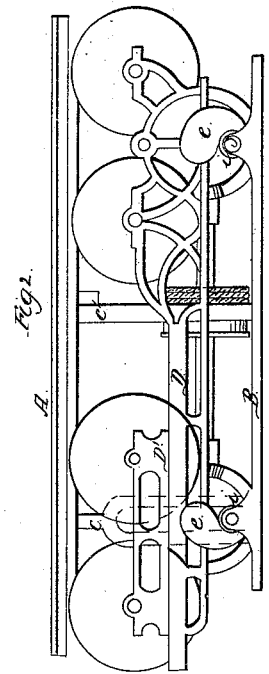
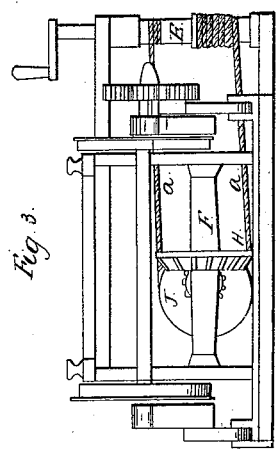
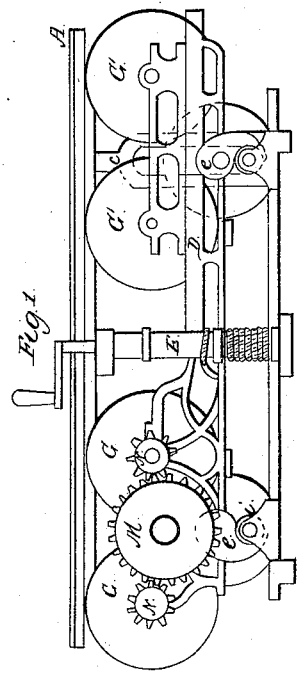

UNITED STATES PATENT OFFICE.

A. D. MERRITT AND C. KIMPLER, OF WOODSTOCK, ILLINOIS.

SUPPLYING LOCOMOTIVE-ENGINES WITH WATER.

Specification of Letters Patent No. 30,829, dated December 4, 1860.

*To all whom it may concern:*

Be it known that we, ANSEL D. MERRITT and CORNELIUS KIMPLER, of Woodstock, in the county of McHenry and State of Illinois, have invented certain new and useful Improvements in Machines for Raising Locomotive-Engines to Enable Them to Supply Themselves with Water; and we do hereby declare that the following is a full, clear, and exact description of the same, reference being had to the accompanying drawings and to the letters of reference marked thereon.

The nature of our invention consists in raising the locomotive drivers upon a wheel or the wheels of an inverted truck or trucks, by means of, or through which the power of the engine is transferred to the pump, for the purpose of supplying the tender with water.

In the annexed drawings Figures 1 and 2 are side elevations. Fig. 3 is an end view. Fig. 4 is a plan view.

In the figures A, represents the rail upon which the cars run; B, represents a frame which is placed beneath the track and which is provided with uprights or standards $c$, $c'$, which support the rails A, upon their upper ends. Beneath the rails is also placed a truck (or trucks,) which is inverted so as to bring the tread of the truck wheels against the tread of the drivers, when said truck is raised so that the two will meet. This truck D, is supported upon two shafts F, F, which lie crosswise and beneath it. Upon the outer ends of the shafts F, F, are secured cams $e$, $e$, which rest upon rollers $i$, $i$, secured to the frame B. The shafts F, F, pass through slots in the standards $c$, $c$, and said shafts are provided with bevel wheels H, H, as represented in the drawings.

I, represents a shaft which runs lengthwise of the truck, and which rests and is secured in proper bearings connected with said truck. This shaft has two bevel wheels L, upon it which gear into the wheels H, H, as seen in Fig. 4. Upon the shaft I, is also secured a drum J. We do not propose to confine ourselves to this form of drum, for we prefer to use a double fusee wheel that is two cones with their bases placed together.

E, represents a windlass which is secured to the frame B. Two cords pass from this windlass and around the drum J, being so arranged that the drum will be revolved when the windlass is turned in either direction. By turning the windlass in one direction the cams $e$, $e$, will be caused to turn by means of the shafts (F), the wheels (H). and L, shaft I, drum J, and cords $a$, so as to raise the truck; but by turning said windlass in an opposite direction the cams will cause the truck to descend. Upon the shafts of the two truck wheels G, G, are secured two pinions N, N, which are connected by means of the gear wheel M. The shaft of the gear wheel M, is prolonged and provided with a crank or pulley or any other suitable device, with which a pump may be driven. Two of the truck axles bear upon a sliding frame D', so that the truck wheels may be adjusted to suit the difference of the spaces between drivers on different locomotives.

In using this invention, the frame, B, and the truck, are embedded beneath the rail at any desired point on the track where water is to be supplied to the tender. The locomotive approaches and stands immediately over the truck. By turning the windlass the truck is raised as has been described by means of the cams $e$, $e$. The truck wheels, standing under and against the drivers raise said drivers until the friction caused by the weight of the engine, is transferred from the rails A, to the wheels of the truck. The drivers are then set in motion and instead of propelling the cars, they propel the truck wheels and thus through the wheels, N, N, and M, transfer power from the drivers to the pump, which is connected to the shaft of wheel M, as has been stated. When sufficient water has been pumped up in this way to supply the tender, the truck is gradually lowered as has been described and the engine is enabled to pass on, without further obstruction.

It will at once be seen that this is a very useful and convenient mode of supplying water to tenders. By the old plan, separate power had to be used for drawing water, men had to be employed to take care of the power as well as to draw water, and tanks had to be used in order to keep a constant supply of water on hand.

In cold climates and during the winter seasons it is very difficult to prevent the tanks from freezing up, and thus cutting off the supply of water.

The object herein accomplished may be accomplished in other way. In some cases the rail may be dropped.

Having thus fully described our invention we claim—

The employment of the inverted truck D, placed beneath the track and made adjustable as described by means of which truck the engine drivers are raised from the rails, as and for the purpose herein specified substantially as described.

ANSEL D. MERRITT.
CORNELIUS KIMPLER.

In presence of—
 GEO. S. KASSON,
 A. H. SELLERS.